(No Model.)
C. B. BRADSHAW & J. HEWETT.
FLOOD GATE.
No. 247,603. Patented Sept. 27, 1881.
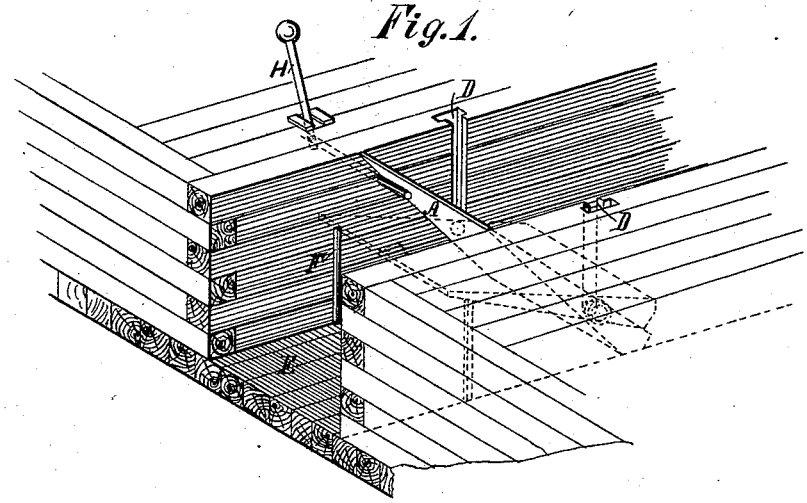
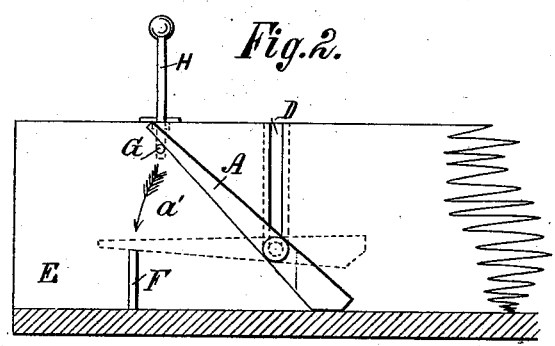
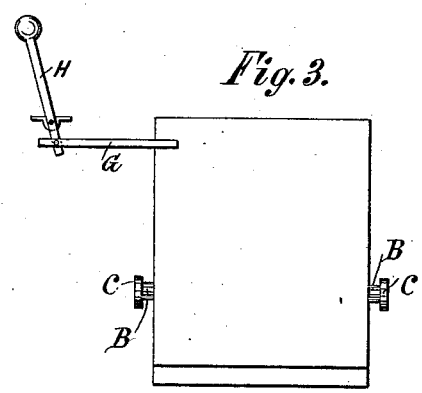

UNITED STATES PATENT OFFICE.

CORNELIUS B. BRADSHAW AND JAMES HEWETT, OF NEILLSVILLE, WIS.

FLOOD-GATE.

SPECIFICATION forming part of Letters Patent No. 247,603, dated September 27, 1881.

Application filed May 7, 1881. (No model.)

*To all whom it may concern:*

Be it known that we, CORNELIUS B. BRADSHAW and JAMES HEWETT, of Neillsville, Clark county, Wisconsin, have invented a new and Improved Flood-Gate, of which the following is a specification.

The object of our invention is to provide a new and improved automatic flood-gate which can be removed from the flume very conveniently when desired.

In the accompanying drawings, Figure 1 is a perspective view of a flume provided with our improved flood-gate, showing the same rasied. Fig. 2 is a longitudinal elevation of the same, and Fig. 3 is a front elevation of the gate.

Similar letters of reference indicate corresponding parts.

The thickness of the gate A increases from the top toward the bottom, so that the sides will be beveled, and the lower part of the gate will be heavier than the upper part.

The gate is provided with pivots B, provided with heads or flanges C, and projecting from the ends of the gate at about one-third of the height of the same. These pivots fit in grooves D in the sides of a flume, E, the pivots resting in the lower ends of these grooves when the gate is in the proper position. These grooves are of such a length that the gate will be (when in a raised position) at an angle of forty-five degrees to the bottom of the flume.

The sides of the flume are provided with projecting strips F, on the upper ends of which the gate rests when the same is lowered.

A bar or rod, G, sliding at right angles to the length of the flume, is attached to the lower end of a lever, H, by means of which it can be projected into the flume or withdrawn.

The lower end of the gate A is preferably beveled, so as to form a close joint in the bottom of the flume.

The operation is as follows: If the flume is empty, the gate A will be raised as the heavier lower end will descend, and the water as it enters will be stopped by the gate, which occupies the full width of the flume. When the flume is full the weight of water above the pivots B and the lifting power of the water below the pivots turn the gate in the direction of the arrow $a'$, thus permitting the water to flow out of the flume; but as soon as the flume is empty, or almost so, the gate A will be held in the raised position by the action of the weight of its lower part. If the gate is to be locked in the raised position, the lever H is turned so that the end of the bar or rod G will project from the side of the flume, as shown in the drawings. The upper end of the gate will then rest against this projecting rod, and cannot be turned down by the action of the water. If heavy logs are to be floated through the flume, the gate A can be removed by means of an ordinary windlass, the pivots B sliding out of the grooves D.

This gate opens and closes itself automatically, and will be found to be of great service in floating wood, as it collects a quantity of water, and by suddenly releasing it produces a powerful current to float off the logs.

Having thus described our invention, we claim as new and desire to secure by Letters Patent—

1. In combination with a flume, a gate arranged to swing on horizontal pivots, and having an excess of weight below said pivots and an excess of superficial area above the pivots, whereby it is adapted to act automatically at different stages of the water, as and for the purpose set forth.

2. The combination, with the pivoted flood-gate A, of the latch projecting from the side of the flume, and of the operating-lever H, substantially as herein shown and described, and for the purposes set forth.

3. In combination with the flume E, provided with the ways D, of the gate A, provided with the horizontal pivots B, and having an excess of weight below and an excess of superficial area above the said pivots, substantially as and for the purpose set forth.

CORNELIUS B. BRADSHAW.
JAMES HEWETT.

Witnesses:
G. A. GRUNDY,
LOUIS SCHUSTER.